United States Patent Office 2,957,558
Patented Oct. 25, 1960

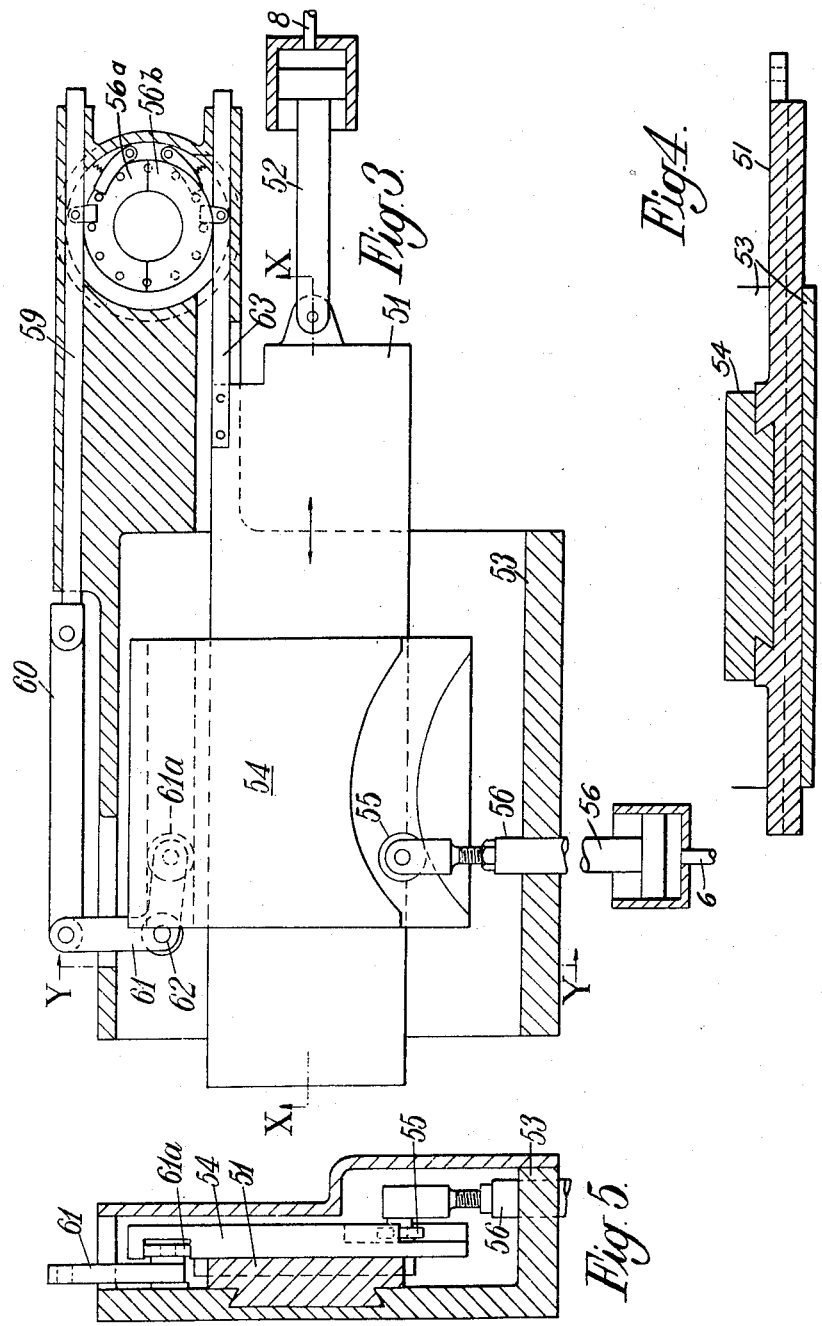

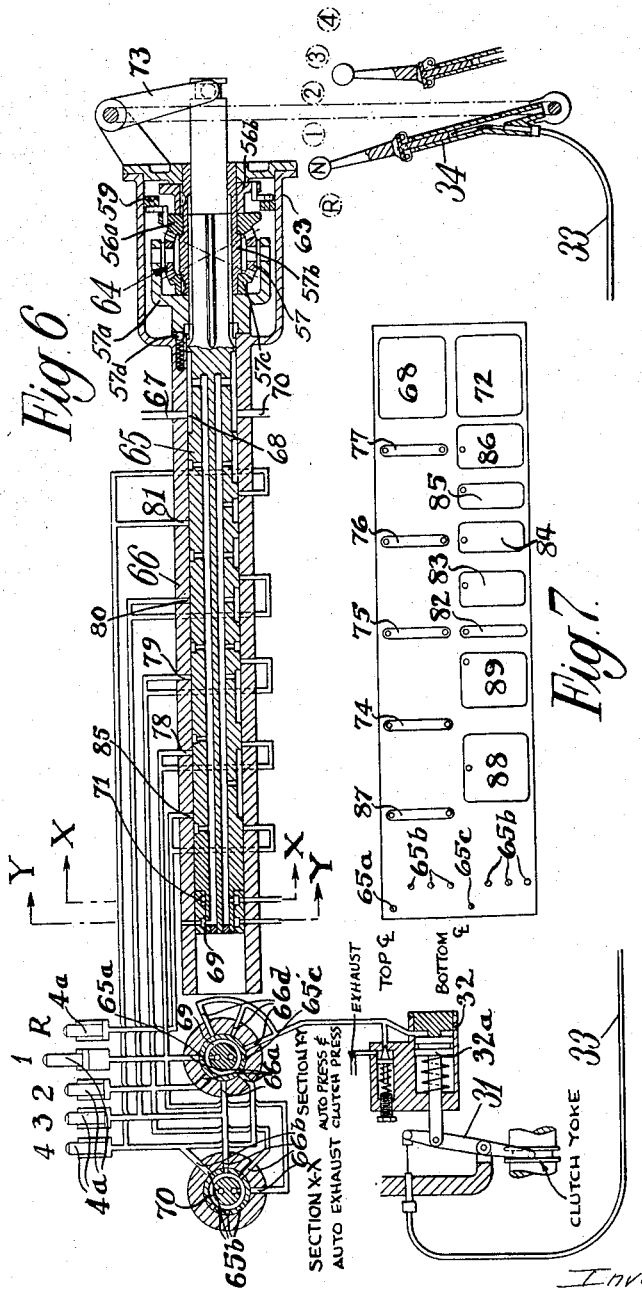

2,957,558

AUTOMATIC GEAR-CHANGING SYSTEMS

Antony Harry Croucher, "Homewood," West End Lane, Esher, England

Filed Nov. 7, 1955, Ser. No. 545,470

Claims priority, application Great Britain Nov. 8, 1954

2 Claims. (Cl. 192—3.5)

This invention relates to automatic gear-changing systems.

Hydraulic clutches are known of the kind in which the hydraulic pressure for engaging the clutch plates is produced by actuation of a self-contained pump by the relative movement of the two rotating parts of the clutch. Clutches of this type are described in U.S. Patent No. 2,719,621 to Clough and U.S. Patent No. 731,483 to Matson. With such an arrangement if a small leak is provided in the hydraulic system, then a small controlled slip will be introduced in the clutch. This will ensure that the hydraulic pressure will at all times be a measure of the actual torque being transmitted, the greater the torque the greater the hydraulic pressure required to maintain the engagement of the clutch plates.

The present invention consists of a control arrangement for automatic gear-changing comprising a motor, a hydraulic clutch of the kind described having a leak provided in the hydraulic system and driven from the motor, a gear-box driven from the clutch, gear-changing means for the gear box, means responsive to the pressure of the hydraulic fluid in the clutch, means responsive to the speed of rotation of the motor and means activated by the first and second responsive means, in accordance with the torque/speed characteristics of the motor, for controlling the gear-changing means to effect gear changes as required.

The hydraulic pressure can, for instance, be applied to a spring-loaded ram or like device to measure or indicate the torque being transmitted by linear or rotary displacement of the ram.

In addition, a speed measuring device such as a tachometer or a centrifugal weight device, may be used to provide a linear or rotary indication of speed.

The outputs of the two devices may be correlated by a third device, such as a reference "cam" or like device the characteristics of which match the torque/speed characteristics of the particular engine, prime mover, or power source in use.

The output of the third device, which again may be either linear or rotary, will at all times be a measure of the "power" actually being transmitted, and this in turn may be used to control gear selection by a servo-assisted or like "shift" mechanism of any type (electric solenoid, hydraulic, or pneumatic) applied to any synchro-mesh or epi-cyclic gear-box, or even a torque converter.

As an alternative to linear or rotary mechanical movement of the three devices, electric devices may be used— i.e. electric currents to indicate torque and speed and electrically correlated to operate the shift mechanism.

The devices may be set so that the operation of the shift takes place slightly in advance of necessity so that there will always be a small margin of power in hand (or reserve) to avoid stalling or over-strain.

An over-riding manual control may be readily provided or incorporated.

Preferably means are provided for maintaining the clutch leak at a constant rate, independently of the torque being transmitted and the revolutions per minute.

The invention will be further described with reference to the accompanying drawings.

Figure 3 is a section of a speed/torque relator suitable for incorporation in the arrangement of Figure 1.

Figure 4 is a section on the line X—X of Figure 3.

Figure 5 is a section in the line Y—Y of Figure 4.

Figure 6 is a layout of a fluid control system in accordance with the invention.

Figure 7 is a development of the porting of the valve of Figure 6.

Figure 1:
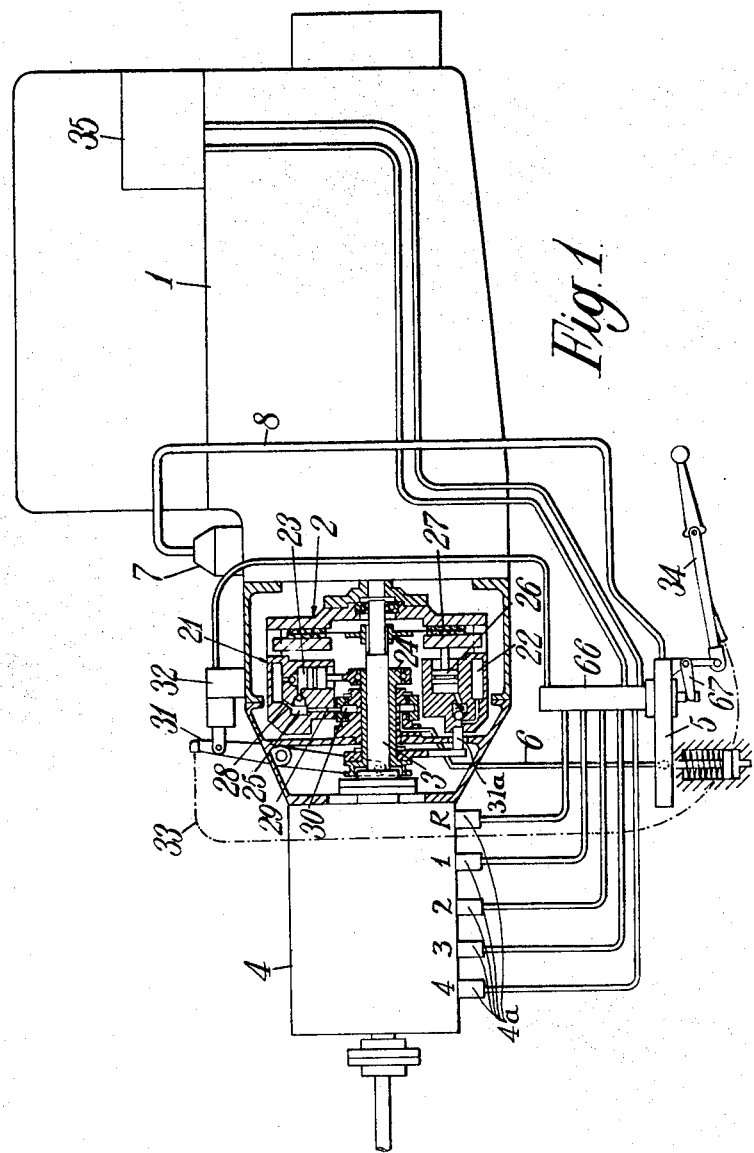
Figure 1 is a dagrammatic layout of an arrangement according to the invention.

In the drawings the engine 1 drives an hydraulic clutch 2 of the kind described. When the clutch is engaged the input shaft 3 to the gear box 4 is driven.

The gear shifts in the gearbox 4 may be effected hydraulically, electrically or pneumatically and the control of the gear shifts is effected from the speed/torque integrator 5.

The speed/torque integrator 5 (Fig. 1 and Figs. 3, 4 and 5) is fed with pressure fluid from the clutch over pipe 6 and is also fed with a speed indication from tachometer drive 7 measuring engine speed, which may be electrical, hydraulic or centrifugal, over pipe (or wire) 8.

While the integrator may be hydraulic, electrical or pneumatic, one form is shown in Figure 3.

The clutch 2 comprises a clutch body 21, with an annular hydraulic reservoir 22 and a radially disposed reciprocating piston pump 23 supplied from the reservoir 22 and driven from the eccentric 24 rotating with the shaft 3. This type of pump is described in applicant's U.S. Patent No. 2,868,342.

The pump expels hydraulic fluid into the annular connection passage 25 from which it passes to the ram chambers of the circumferentially disposed spaced pressure pistons 26 which act in the axial direction to engage the clutch friction plates 27.

There is a leak passage 28 provided from annular connection passage 25 back to annular reservoir 22 and this is located to be under centrifugal control to keep the leak constant at all speeds of revolution. The leak ensures that the hydraulic pressure is always a function of the torque transmitted by the clutch, since a small controlled slip is produced which overcomes static friction and keeps and pump working. It can be made adjustable.

A connection passage 29 leads from the annular passage 25 to a rotating hydraulic joint 30 and thence to the pipe 6.

The control of the clutch is effected from a lever 31, (Figs. 1 and 6) controlling a one-way discharge valve 31a from the ram chambers of pistons 26 to the annular reservoir 22 and which may be operated either from an automatic control arrangement 32 driven from the integrator 5 or over a cable 33 from a manual control lever 34. When valve 31a opens, the hydraulic pressure behind rams 26 is released, and the clutch plates disengage. The hydraulic power source for operating the gear box over the integrator is shown at 35.

In the integrator 5 the pipe 8 is used to reciprocate a slide member 51 over link 52 (or directly) by means of a piston and chamber on a support 53 which forms the main frame of the unit. Slide 51 has fitted therein a cam member 54 arranged to slide at right-angles to the direction of slide of member 51 and having a slot 54a curved to correspond to the speed/torque curve of Figure 2. In the slot 54a there operates a roller 55 on the end of a reciprocating member 56 controlled from the hydraulic pipe 6 (Figure 1) over a piston and chamber and adjustable to suit engine conditions.

Gear changes are effected over a pair of oppositely rotatable wheels 56a and 56b, wheel 56a being driven in one direction by one end of a bar 59.

Bar 59 is pivotally connected at the other end to one end of a further link 60 which in turn is pivotally connected at its other end to one end of a bell crank lever 61 pivotally mounted on support 62 and having at its other end a roller 61a running in a slot in the cam member 54.

The ratchet wheel 56b is driven in the other direction by a bar 63 on the slide 51.

Through a differential 64 (Fig. 6) the ratchet wheels drive a cylindrical valve member 65 in a cylindrical valve casing member 66 (Figs. 1 and 6) which is suitably connected with the gear shift pistons 4a of the gear box 4. From Fig. 6 it can be seen that wheel 56a is formed with a ring gear of the differential which drives the planet gears 57 and the planet gear carrier 57a along with the valve member 65 splined thereto. Wheel 56b is keyed to a hollow shaft 57b to which another ring gear 57c is keyed, the hollow shaft being rotatable with respect to wheel 56a and valve member 65. Wheel 56b thus drives the planet gears, their carrier, and the valve member 65 in the opposite direction. Reverse rotation of wheels 56a and 56b is prevented by their ratchet mechanisms, and positive indexing of the valve member 65 is ensured by a spring loaded ball 57d mounted in valve shell 66 and engaging the end of the planet carrier as shown.

The link up between the automatic clutch control arrangement 31 and the valve connections to the gear shift pistons is shown in Figure 6 which should be clear with the aid of the porting diagram Fig. 7.

Pressure fluid is fed in at 67 and passed by the port 68 of inner valve member 65 to port 69.

In accordance with the rotational movement of inner valve member 65 about its axis each one of the forward gear shifting pistons 4a can be connected to the pressure fluid supply in turn over port 69, passage 65a in inner valve member 65 (section Y) and passages 66a in the outer valve member 66, and the other pistons 4a connected to exhaust 70 over passages 66b in outer valve member 66, (Section X), passages 65b in inner valve member 65, port 71 and port 72.

The necessary clutch operations are effected in between each gear operation by passage 65c in inner valve member 65 connecting pressure fluid from port 69 to passages 66d in outer valve member 66 and thence to the cylinder of automatic control arrangement 32 to move the piston 32a operating the lever 31.

In operation as the engine is revved up slide 51 driven by speed responsive device 7 (Fig. 1) moves to the left from its right-hand position in Figure 3, rod 63 driving the ratchet wheel 56b and hence turning the valve member 65 (Fig. 6).

Figure 2:
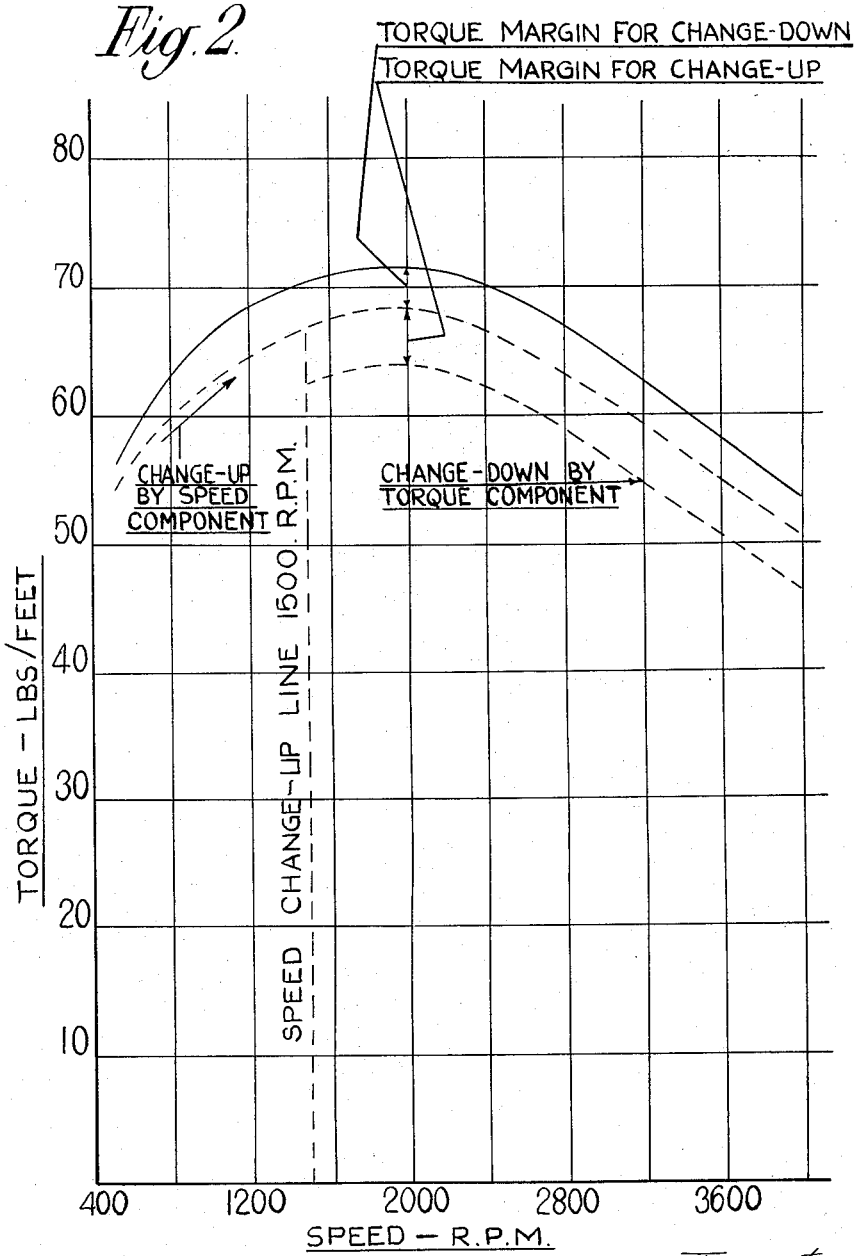
Figure 2 shows a typical graph of speed/torque.

The turning of valve member 65 is effective to apply hydraulic pressure to the gear shifting pistons 4a to shift the gears, pressure being applied to the clutch control mechanism 32 before each shifting of gears to permit the clutch to disengage. As the speed increases, the torque also increases as shown in Fig. 2, and the roller 55 rises by virtue of the increased hydraulic pressure applied to rod 56 from pipe 6 (Fig. 1). Slot 54a in cam 54 is made wide enough to permit the roller 55 to clear the lower boundary surface of the slot when the rod 56 rises, and thus if the torque increases as a predetermined function of the speed, as shown in Fig. 2, the roller 55 will permit slide 51 to move unimpeded to shift the gears up. The gear is thus changed up in accordance with the speed component. Similar operations are effected for all changes-up of gear as the engine speed increases after each previous gear change. Down shifting is controlled by torque responsive roller 55 and the cam 54 (Fig. 3). The engagement of roller 55 with the upper boundary surface of groove 54a is dependent upon the torque at any given engine speed, which determines the position of slide 51 and hence the position of roller 55 along the groove. If at a given speed the torque rises sufficiently to engage roller 55 with the upper boundary surface of the groove, cam 54 is moved upward along with roller 61a, turning the bell crank 61 counter-clockwise and reciprocating rod 59 to give a corresponding counter-clockwise turning movement to wheel 56a. This turns valve member 65 to change the gears down, the clutch being actuated before each gear change, as previously described.

Similar operations are repeated for all changes-down of gear.

Overriding manual control can, of course, be effected from the control lever 34. The initial movement of lever 34 (causing it to "break" as shown in Fig. 7) operates the clutch over cable 33 and the further movement of control lever 34 effects the gear change over radius arm 73 connected to the pivot of lever 34 at its inner end and at its outer end engaging the valve member 65 to reciprocate it.

For each movement of arm 73 to the left successive ones of ports 74, 75, 76 and 77 are brought to register with the corresponding passages 78, 79, 80 and 81 in outer valve member 66 to supply pressure fluid to the corresponding gear shift piston 66a, while the remaining gear shift pistons are connected over the respective ones of ports 82, 83, 84, 85 and 86 to port 72 and hence to exhaust 70.

If arm 73 is moved to displace inner valve member 65 to the right pressure fluid is extended from port 87 to the reverse gear shifting piston 4a and the remaining pistons are connected to exhaust 70 over ports 88, 89, 83 and 85 respectively.

Various modifications may be made within the scope of the invention.

I claim:
1. A control arrangement for automatic gear-changing comprising a motor, an hydraulically actuated clutch of the kind having a leak provided in the hydraulic clutch-actuation system and driven from the motor, a gear-box driven from the clutch, gear-changing means for the gear box, means responsive to changes in the pressure of the hydraulic fluid in the hydraulic clutch-actuation system, means responsive to the speed of rotation of the motor and means actuated by the first and second responsive means, for controlling the gear-changing means to effect gear changes as required in accordance with the torque/speed characteristics of the motor.

2. A control arrangement for automatic gear-changing as claimed in claim 1 in which the leak operates at a constant rate.

References Cited in the file of this patent
UNITED STATES PATENTS

| | | |
|---|---|---|
| 2,153,509 | Rockwell | Apr. 4, 1939 |
| 2,307,676 | Harlan | Jan. 5, 1943 |
| 2,397,343 | Ferris | Mar. 26, 1946 |
| 2,753,024 | Weaving et al. | July 3, 1956 |